United States Patent
Chabert

[15] 3,644,226
[45] Feb. 22, 1972

[54] ANION-EXCHANGE COPOLYMERS
[72] Inventor: Henri Chabert, Lyon, France
[73] Assignee: Rhone-Poulenc S.A., Paris, France
[22] Filed: Sept. 29, 1969
[21] Appl. No.: 861,991

[30] Foreign Application Priority Data
Oct. 1, 1968    France.....................................168323

[52] U.S. Cl. .......................................260/2.1 E, 260/878 B
[51] Int. Cl. .......................................................C08f 19/08
[58] Field of Search....................................260/2.1 E, 878 B

[56] References Cited
UNITED STATES PATENTS

3,189,665  6/1965  Nozaki...................................260/881

FOREIGN PATENTS OR APPLICATIONS

1,282,751  12/1961  France
1,493,009  7/1967  France

*Primary Examiner*—Melvin Goldstein
*Attorney*—Stevens, Davis, Miller & Mosher

[57] ABSTRACT

Crystalline, sequence-type, propylene-styrene copolymers containing quaternary ammonium residues are useful for making anion-exchange membranes.

2 Claims, No Drawings

ANION-EXCHANGE COPOLYMERS

The present invention relates to copolymers based on propylene and styrene and to anion-exchange membranes derived therefrom.

French Pat. No. 1,493,009 describes statistical copolymers of propylene and styrene (that is to say copolymers in which the propylene and styrene units are distributed at random in the macromolecular chains) containing quaternary ammonium groups fixed by chloromethylation followed by quaternization, it being possible for the said copolymers to be shaped into films. These films, which consist of a material containing ion-exchange groups, can be used as ion-exchange membranes in electrodialysis devices.

It has now been found that ion-exchange membranes which can be used in electrodialysis and have better electrochemical and mechanical properties than the above-mentioned membranes can be obtained by carrying out the chloromethylation and the quaternization on crystalline sequence-type copolymers of propylene and styrene. By sequence-type copolymers of propylene and styrene are meant copolymers of formula:

$$(P-S)_n \quad (I)$$
$$\text{or } (P-S)_nP \quad (II)$$
$$\text{or } S(P-S)_n \quad (III)$$

in which P represents a polypropylene chain, S represents a polystyrene chain and $n$ is a positive integer less than or equal to 4, preferably equal to 1.

The average molecular weight of the copolymers of formula I, II or III used in the invention is generally from 100,000 to 1,000,000. The proportion by weight of styrene in the copolymers is between 5 and 80 percent, preferably about 15 and 40 percent, the residue being propylene.

Thus the invention provides crystalline, sequence-type propylene-styrene copolymers having quaternary ammonium residues attached to the phenyl nuclei of the styrene residues via methylene groups. The quaternary ammonium residues are preferably of the formula:

where $R^1$, $R^2$ and $R^3$ are each alkyl of one to four carbon atoms, or

where $R^4$ and $R^5$ are each alkyl of one to four carbon atoms.

The crystalline sequence-type copolymers of propylene and styrene are prepared in successive stages. In a first stage, a homopolymer of one of the two monomers, for example, the propylene, is prepared. Then, in a second stage, after having removed the unpolymerized remnants of this first monomer, the second monomer is brought into contact with the previously formed homopolymer and a fresh polymerization is carried out. Several polymerization operations can thus successively be carried out, changing the monomer employed in each case.

These polymerization operations are carried out by methods known generically as cationic polymerizations. The catalysts used in this type of polymerization are well known. They consist of at least two constituents, namely a transition metal halide combined with a cocatalyst or activator. Mixtures containing a halide of a metal of groups IVB to VIB of the periodic classification (numbering in accordance with HODGMAN et al., "Handbook of Chemistry and Physics," 40th edition page 448) associated with aluminum or an aluminum halide or an organo-aluminum compound are especially useful. Preferably, titanium chlorides associated with organo-aluminum compounds such as triethyl-aluminum, triisobutyl-aluminum, triisohexyl-aluminum, trioctyl-aluminum, dimethyl-aluminum chloride and diethyl-aluminum chloride, ethyl-aluminum dichloride of methyl-aluminum bromide are used.

The pressures employed during the polymerization are generally between atmospheric pressure and 45 bars. The temperature is 0° to 85° C., preferably 50° to 70° C. Finally, the process can be carried out in the presence of a solvent, for example an aliphatic or aromatic hydrocarbon.

The chloromethylation reaction can be carried out on the sequence-type propylene-styrene copolymers in the form of a film, of granules or of chips, or preferably in the form of a powder.

Various chloromethylating agents are well known to the specialist. Formaldehyde associated with hydrochloric acid, methyl-chloromethyl ether or ethyl-chloromethyl ether can, for example, be mentioned. The reaction is generally carried out in the presence of a catalyst; catalysts for reactions of the Friedel-Crafts type, such as aluminum chloride, zinc chloride, titanium tetrachloride or boron trifluoride are very suitable for this purpose. The chloromethylation temperature is not critical and the reaction can take place at a temperature as low as 0° C. or at much higher temperatures, of the order of 150° to 200° C., the process being carried out at atmospheric pressure or under superatmospheric pressure. It is however preferable not to carry out the process at too low a temperature, so as to achieve a sufficient reaction speed. It is also preferable not to carry out the process at too high a temperature such that appreciable thermal degradation of the copolymer occurs. The chloromethylation can take place in the liquid phase or in the vapor phase. When the process is carried out in the liquid phase, it is possible to carry out the reaction with or without a diluent.

It is generally preferred to carry out the process in the liquid phase without a diluent, at atmospheric pressure and at the boiling point of the chloromethylating agent used.

The reaction time varies depending on the envisaged degree of chloromethylation. The process is generally carried out under conditions such that each aromatic nucleus present can fix one chloromethyl substituent.

In order to introduce the quaternary ammonium groups, the chloromethylated product, either in the crude form or in a shaped form, is subjected to the action of a tertiary amine. Among the various tertiary amines which can be used, there may be mentioned the trialkylamines, e.g., of the formula:

where $R^1$, $R^2$ and $R^3$ are each alkyl of one to four carbon atoms, such as trimethylamine or triethylamine, it being possible for the alkyl radicals to carry functional groups which are not able to interfere through side-reactions; thus alkylakanelamines such a dimethylethanolamine, or triethanolamine can be used. The heterocyclic amines such as pyridine, the N-alkylpiperazines and the N, N'-dialkylpiperazines, e.g., of the formula:

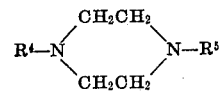

where $R^4$ and $R^5$ are each alkyl of one to four carbon atoms are also very suitable.

The temperature conditions are not critical and the process can be carried out with excellent results at temperatures from 0° to 150° C., preferably 20° to 100° C. Though this reaction can be carried out under superatmospheric pressure, it is in practice preferred to carry it out at atmospheric pressure. The quaternization can be effected in the liquid phase or in the vapor phase; when the process is carried out in the liquid phase, it is possible to incorporate a diluent such as, for example, water. While it is possible to carry out a partial quaternization, it is preferable that the reaction should be as complete as possible as this leads to the best properties of the membranes made from the quaternized copolymer.

The preparation of membranes according to the invention, which can be used in electrodialysis or in fuel cells, is preferably effected by pressing or calendering, or by any other known means, the crystalline sequence-type propylene-styrene copolymer which has already undergone the chloromethylation and quaternization treatments. The pressing or calendering operations are generally carried out at temperatures above 150° C.

It is also possible to prepare heterogeneous membranes consisting of a matrix and, as anion-exchange resin, a sequence-type propylene-styrene copolymer which has been chloromethylated and quaternized in accordance with the invention.

In order to improve the mechanical properties of the membranes according to the invention it is frequently advantageous to reinforce them by incorporating into them, during their preparation, reinforcing supports such as for example screens, grids or woven fabrics.

In order to assess the properties of the membranes prepared, the following measurements were carried out:

a. Electrical substitution resistance. The electrical substitution resistance for a given membrane surface area is the change in electrical resistance of a liquid cylinder when the membrane is substituted for a layer of liquid of the same thickness and the same surface area as the membrane, in a position at right angles to the axis of the cylinder. In the present case this substitution resistance is measured in an 0.6 M aqueous KCl solution: it is expressed in ohm.cm.$^2$.

b. Selective permeability. This is the ability of the membrane only to allow anions to pass, whilst excluding cations. This selective permeability is deduced by calculation from the measurement of the electromotive force E existing between two aqueous KCl solutions, respectively 0.4 and 0.8 M, separated by the membrane in question which has beforehand been saturated with an 0.6 M aqueous KCl solution.

The formula giving the selective permeability as a percentage is:

$$\frac{P}{100} = \frac{\bar{t}^+ - t^+}{1 - t^+}$$

in which $t^+$ is the transport number of $Cl^-$ in an 0.6 M aqueous KCl solution, and $\bar{t}^+$ is the transport number of $Cl^-$ in the membrane.

$\bar{t}^+$ is given by the formula:

$$\bar{t}^+ = \frac{E + Eo}{2Eo}$$

in which $Eo = (RT/F) \ln(a_1/a_2)$ wherein R = gas constant

T = absolute temperature

F = Faraday constant (96,489 coulombs per gram equivalent), $a_1$ = activity of the electrolyte in the more concentrated compartment (calculated from the concentration of the electrolyte and the activity coefficient), and $a_2$ = activity of the electrolyte in less concentrated compartment.

The Examples which follow illustrate the invention.

EXAMPLE 1

750 cm.$^3$ of toluene, 4 g. of TiCl$_3$ and 10.2 g. of triisobutylaluminum are introduced into a 2-liter glass flask fitted with a stirrer, a thermometer, a dropping funnel, a gas inlet tube and a safety valve, and purged beforehand with nitrogen. The gas phase is purged with propylene and a pressure of propylene 10 cm. of mercury above atmospheric pressure is maintained. The temperature progressively rises to 50° C. in 30 minutes. The residual propylene is then driven off, the system purged with nitrogen, and 35 cm.$^3$ of styrene are then introduced over the course of 35 minutes while the temperature is kept at 50° C. The temperature is then raised to 68° C. and kept at this value for 1 hour. The reaction mixture is cooled and then poured into 3 liters of methanol, which causes flocculation of the polymer. The polymer is separated and then treated for 8 hours with 3 liters of a mixture of methanol/concentrated hydrochloric acid (proportions by volume, 90/10) heated to the boil. The polymer is separated and washed with a mixture of methanol/water (proportions by volume 50/50) until the wash waters are neutral. After this the polymer is treated with 3 liters of pure methanol under reflux for 4 hours. The polymer is separated and then dried to constant weight at 50° C. under a pressure of 50 mm. of mercury. 65 g. of a copolymer containing 39 percent by weight of styrene residues are thus obtained, showing two melting points on differential thermal analysis: 164° and 228° C. The presence of these two melting points confirms the sequence-type and crystalline nature of the copolymer obtained.

This copolymer is then subjected to chloromethylation and quaternization operations in the following manner.

20 g. of the propylene-styrene Copolymer, 200 cm.$^3$ of methyl-chloromethyl ether (CH$_3$OCH$_2$Cl) and 2 g. of anhydrous ZnCl$_2$ are introduced into a 1-liter flask. The mixture is heated under reflux for 2 hours and then poured into 1,500 cm.$^3$ of methanol. The polymer is separated and then washed 3 times with 200 cm.$^3$ of methanol. After drying to constant weight at 50° C. under a pressure of 50 mm. of mercury, 24 g. of chloromethylated polymer are obtained.

10 g. of this chloromethylated product are treated for 4 hours at about 25° C. with 100 cm.$^3$ of a 25 percent by weight aqueous trimethylamine solution. After concentrating and drying the residue to constant weight at 50° C. under a pressure of 50 mm. of mercury, 14 g. of a product containing 9 percent by weight of chlorine and 3 percent by weight of nitrogen are obtained.

A membrane of about 0.15 mm. thickness is prepared from this product by pressing at 185° C. between the two platens of a hydraulic press. A flexible membrane is obtained which has a selective permeability of 71 percent and a substitution resistance of 1.5 ohm. cm.$^2$.

EXAMPLE 2

5 g. of the sequence-type chloromethylated copolymer prepared in Example 1 are treated with 100 cm.$^3$ of N, N'-dimethylpiperazine for 4 hours at about 25° C. After concentrating and drying the residue to constant weight at 50° C. under a pressure of 50 mm. of mercury, 7.3 g. of product are obtained.

An approximately 0.15 mm. thick membrane is prepared from this product by pressing at 185° C. between the two platens of a hydraulic press. A flexible membrane is obtained which has a selective permeability of 87 percent and a substitution resistance of 4 ohm. cm.$^2$.

I claim:

1. An ion-exchange resin in the form of a crystalline sequence-type propylene styrene copolymer of the formula:

(P-S)$_n$ (P-S)$_n$P

S(P-S)$_n$ in which P represents a propylene chain, S represents a polystyrene chain and $n$ is a positive integer from 1 to 4, the said copolymer containing 5 to 80 percent by weight of styrene residues, and 95 to 20 percent by weight of propylene residues, the said percentages being based on the combined weight of styrene and propylene residues, and having a molecular weight of 100,000 to 1,000,000, the said copolymer having attached to phenyl nuclei of the styrene residues via methylene groups quaternary ammonium residues of the formula:

where $R^1$, $R^2$ and $R^3$ are each alkyl of one to four carbon atoms or hydroxyalkyl of one to four carbon atoms, or

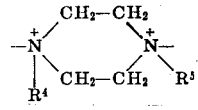

where $R^4$ and $R^5$ are each alkyl of one to four carbon atoms.

2. An ion-exchange membrane consisting essentially of a resin as claimed in claim 1.

* * * * *